US006875935B2

(12) United States Patent
Abrahamsen et al.

(10) Patent No.: US 6,875,935 B2
(45) Date of Patent: Apr. 5, 2005

(54) INTEGRATED CIRCUIT BREAKER LEVERING IN AND HOIST CRANK TOOL

(75) Inventors: Michael Abrahamsen, Arden, NC (US); Steven Walker, Etowal, NC (US); William E. Wilkie, II, Cleveland, TN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/383,464

(22) Filed: Mar. 7, 2003

(65) Prior Publication Data

US 2004/0173443 A1 Sep. 9, 2004

(51) Int. Cl.[7] ............................................. H01H 33/42
(52) U.S. Cl. ............................ 200/50.24; 200/50.25; 361/606
(58) Field of Search ......................... 200/50.24–50.4; 361/606, 336, 339

(56) References Cited

U.S. PATENT DOCUMENTS

| 3,964,573 | A | | 6/1976 | Wilson | |
|---|---|---|---|---|---|
| 5,120,913 | A | * | 6/1992 | Leach et al. | 200/50.26 |
| 5,278,722 | A | * | 1/1994 | Peruso | 361/606 |
| 5,304,755 | A | * | 4/1994 | Romano et al. | 200/50.21 |
| 5,386,987 | A | * | 2/1995 | Rodino, Jr. | 473/417 |
| 5,477,017 | A | * | 12/1995 | Swindler et al. | 200/50.24 |
| 5,721,406 | A | * | 2/1998 | Book et al. | 200/50.24 |
| 6,041,949 | A | | 3/2000 | Walker et al. | |
| 6,066,814 | A | * | 5/2000 | Smith et al. | 200/50.24 |
| 6,184,483 | B1 | * | 2/2001 | Coudert et al. | 200/50.21 |

* cited by examiner

*Primary Examiner*—Kyung Lee
(74) *Attorney, Agent, or Firm*—Martin J. Moran

(57) ABSTRACT

An integrated circuit breaker levering in and hoist crank tool provides a single tool for operating both a winch for raising and lowering a circuit breaker, and a levering in assembly for moving a circuit breaker forward and rearward within its cabinet.

2 Claims, 5 Drawing Sheets

INTEGRATED CIRCUIT BREAKER LEVERING IN AND HOIST CRANK TOOL

BACKGROUND OF THE INVENTION

1. Field of the Invention

The present invention relates to an apparatus for moving a circuit breaker. More specifically, the present invention provides a tool structured to operate both a hoist crank and a circuit breaker levering in mechanism.

2. Description of the Related Art

Although devices for levering in and for lifting circuit breakers are well-known, presently available devices require separate tools to operate them, increasing the costs of production, and increasing the inconvenience of servicing the breakers.

An example of a presently available hoist crank is described in U.S. Pat. No. 6,041,949, issued to S. D. Walker et al. on Mar. 28, 2000. The lifting assembly described therein includes a pair of rail members mounted on an electrical cabinet, upon which a plurality of wheels of the lifting assembly are mounted to permit movement from one side of the cabinet to the other. The support frame extends outward from the cabinet, supporting a winch at its outer end. A crank assembly is provided for rotating the spool of the winch to extend or retract the winch's cable.

U.S. Pat. No. 3,964,573, issued to G. A. Wilson on Jun. 22, 1976, describes a circuit breaker elevator.

A typical levering in assembly for moving a circuit breaker between a forward position and a rearward position within its cabinet is described in U.S. Pat. No. 6,066,814, issued to J. E. Smith on May 23, 2000. The levering in assembly is illustrated specifically in FIG. 6 of Smith. The levering in assembly includes a drive screw extending in the desired direction of travel of the circuit breaker. The drive screw includes a hexagonal tip dimensioned and configured to engage a crank. A levering block is threadedly mounted on the drive screw so that rotation of the drive screw moves the levering in block, and therefore the circuit breaker, forward or rearward within the cabinet. When the circuit breaker is in its rearward position, stabs within the rear panel of the cabinet wall will be electrically connected with quick disconnects on the back of the circuit breaker, permitting current to flow through the circuit breaker and to the protected load. The circuit breaker will typically be moved to the front of the cabinet, wherein the quick disconnects and stabs are disconnected, to ensure that it is completely disconnected from its power source during servicing.

It is presently necessary to use different tools to operate the crank of the winch and the drive screw of the levering in assembly. It is therefore desirable to provide a single tool capable of operating both the drive screw of the levering in assembly, and the crank of the winch. Providing a single tool for both purposes will both reduce the cost of the circuit breaker assembly, and simplify servicing the circuit breaker.

SUMMARY OF THE INVENTION

The present invention provides an integrated circuit breaker levering in and hoist crank tool. The tool includes a crank handle removably secured to a sleeve, which may be removably secured to either a levering in adapter or a hoist crank operating pole.

The sleeve is preferably hexagonal, and defines two pairs of holes, with each pair of holes being dimensioned and configured to receive a pin oriented substantially perpendicular to the hexagonal sleeve. One end of the sleeve is dimensioned and configured to receive a crank handle therein, with the crank handle secured by a pin passing through both a hole in the crank handle, and one pair of holes within the sleeve. The opposite end of the sleeve is dimensioned and configured to receive either the levering in adapter or a hoist crank operating pole, with a second pin passing through both a hole in either the levering in adapter or the hoist crank operating pole, and also the second pair of holes within the sleeve. A cut-out section within the sleeve permits the levering in adapter to pivot within the sleeve, so that when the lowermost circuit breaker within a cabinet is being levered in, the crank handle may be pivoted to avoid striking the floor. When the hoist crank operating pole is inserted into the sleeve, it extends sufficiently far into the sleeve so that it is not permitted to pivot.

To operate the winch, the hoist crank operating pole is inserted into the hexagonal sleeve, and secured in place with a pin. A hook at the opposite end of the hoist crank operating pole engages the crank of the winch. Rotating the crank thereby rotates the hoist crank operating pole, thereby rotating the spool of the winch to extend or retract the winch's cable. Alternatively, the crank handle may be removed from the hexagonal sleeve, and the hexagonal sleeve may fit within the socket of an air socket wrench, which may be used to rotate the hoist crank operating rod in the same manner.

To operate the levering in assembly, a levering in adapter is inserted into the hexagonal sleeve, and a pin is placed through both to secure the levering in adapter in place. The other end of the levering in adapter fits into a square hole at the tip of the drive screw of the levering in assembly. Rotating the crank will thereby rotate the drive screw, moving the circuit breaker either forward or rearward within the cabinet.

BRIEF DESCRIPTION OF THE DRAWINGS

Like reference characters denote like features throughout the drawings.

DETAILED DESCRIPTION

Figure 1:
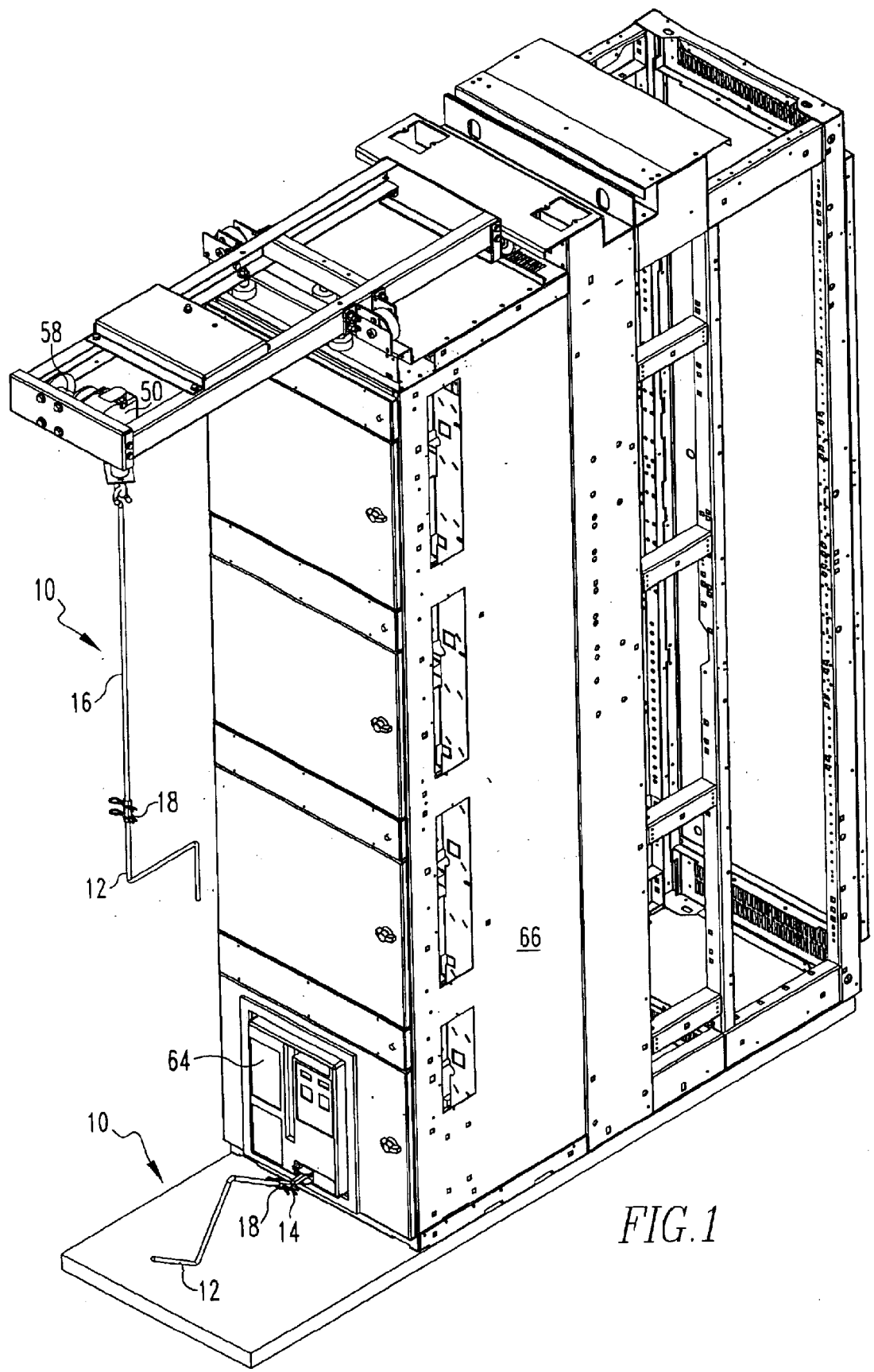
FIG. 1 is an environmental, isometric view of a circuit breaker cabinet utilizing an integrated circuit breaker levering in and hoist crank tool of the present invention.

The present invention provides an integrated circuit breaker levering in and hoist crank tool. Referring to FIG. 1, the tool 10 includes a crank handle 12, a levering in adaptor 14, a hoist crank operating pole 16, and a sleeve for connecting the crank handle 12 to either the levering in adaptor 14 or the hoist crank operator pole 16.

Figure 2:
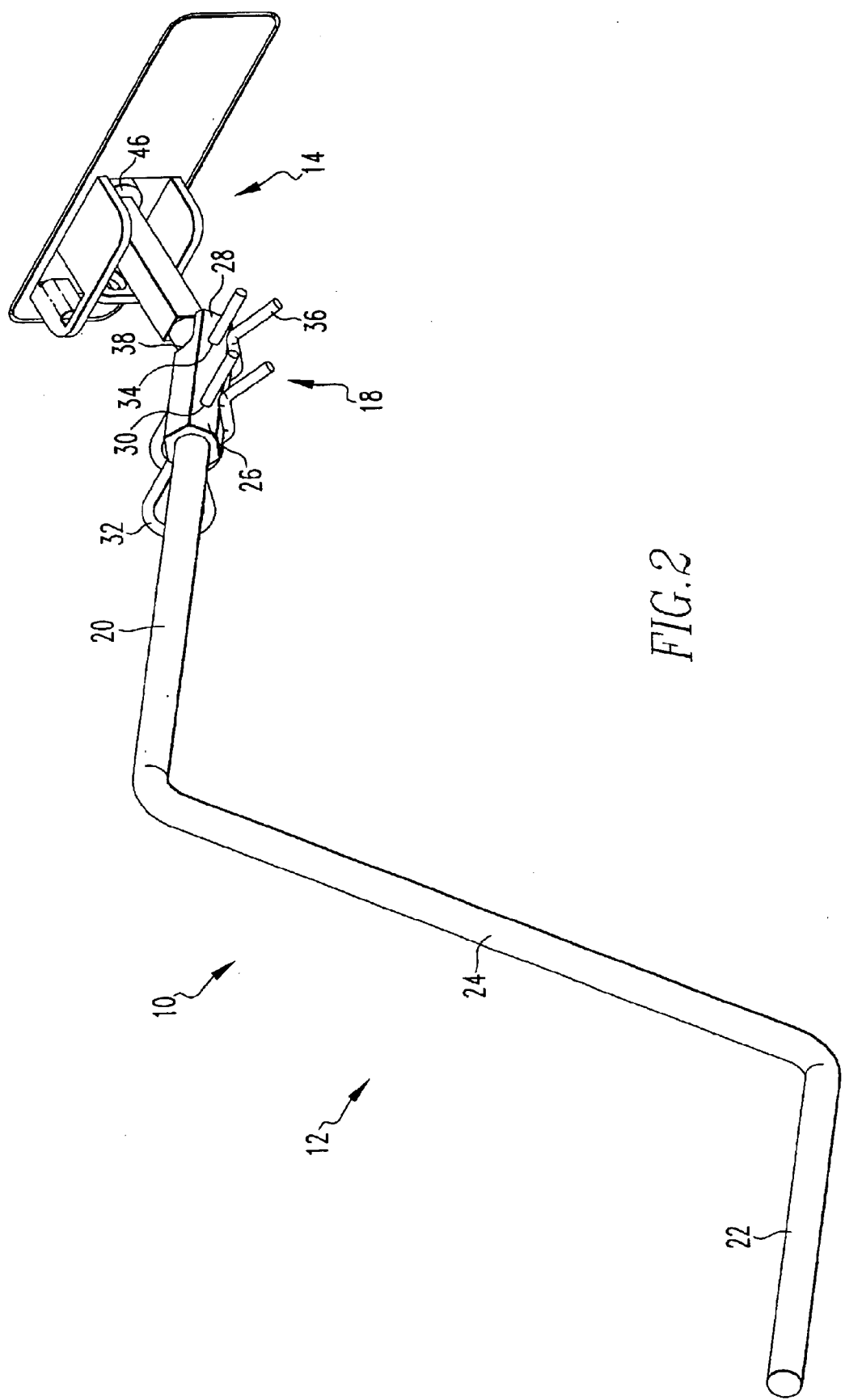
FIG. 2 is an isometric view of an integrated circuit breaker levering in and hoist crank tool according to the present invention, having the levering adapter installed, and engaging the levering in mechanism of a circuit breaker.
Figure 3:
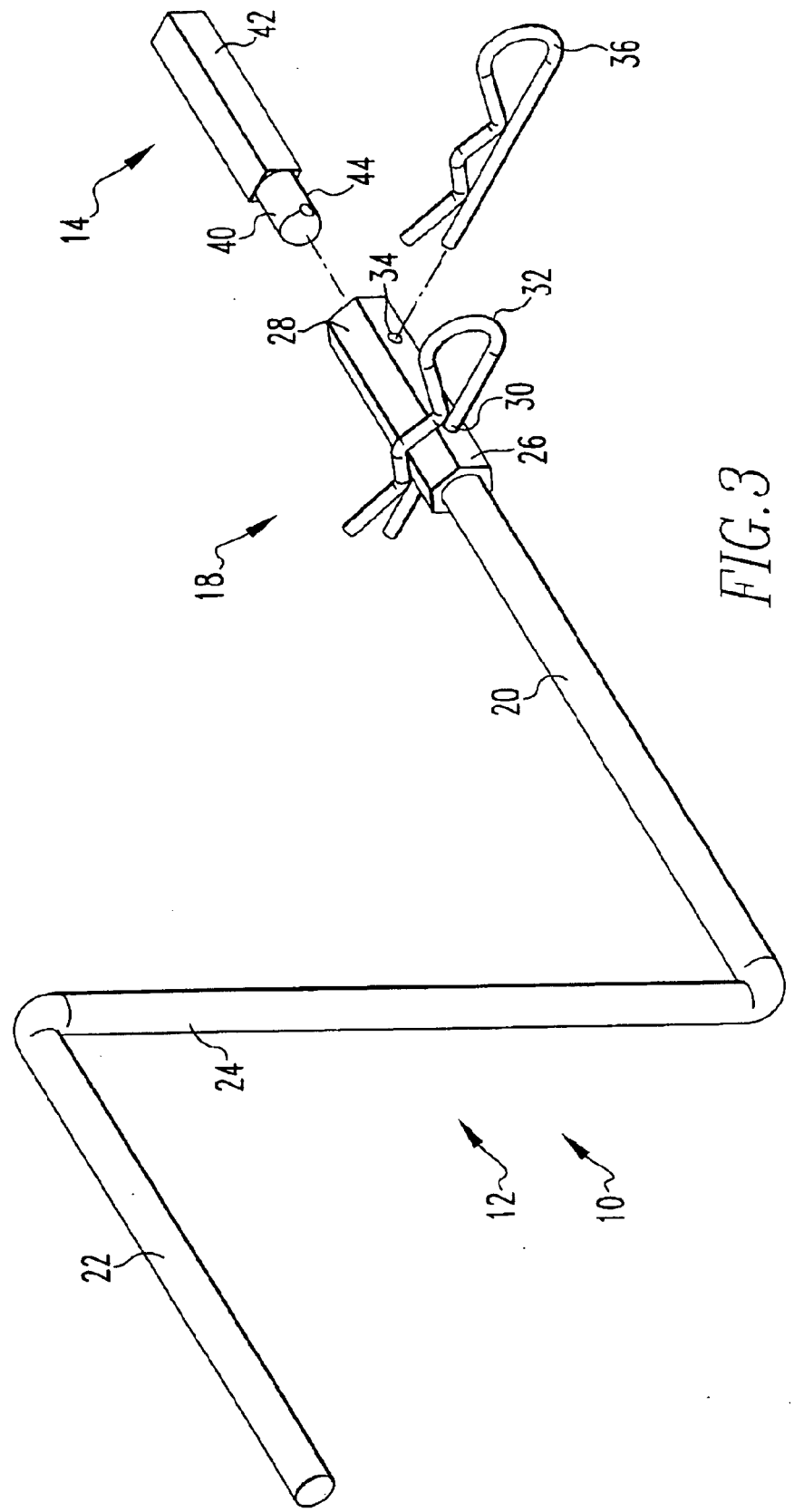
FIG. 3 is a partially exploded, isometric view of an integrated circuit breaker levering in and hoist crank tool according to the present invention, showing the levering in adapter and its securing pin removed from the hexagonal sleeve.

Referring to FIGS. 2–3, the crank handle 12 includes a sleeve end 20, a handle end 22, substantially parallel to the sleeve end 20, and a central section 24, substantially perpendicular to both the sleeve end 20 and handle end 22. The sleeve end 20 is dimensioned and configured to fit within the sleeve 18, and the handle end 22 is dimensioned and configured to be gripped by a user for turning. A hole 25 (FIG. 5) is defined within the sleeve end 20.

The sleeve 18 includes a crank end 26 and a tool end 28. The crank end 26 defines a pair of apertures 30, dimensioned and configured to receive a removable pin 32 therethrough, substantially perpendicular to the sleeve 18, and dimensioned and configured to align with the hole 25 when the crank handle 12 is inserted into the sleeve 18, so that the pin 32 passes through the hole 25 and both holes 30 to secure the handle 12 within the sleeve 18. Likewise, the tool end 28 also defines a pair of apertures 34, dimensioned and configured to receive a removable pin 36, so that the pin 36 is oriented substantially perpendicular to the sleeve 18. The tool end 28 also defines a cutout section 38. The exterior of the sleeve 18 preferably has a noncircular configuration when viewed from either end, with a hexagonal configuration being preferred.

The levering in adaptor 14 includes a sleeve end 40 and a drive shaft engaging end 42. The sleeve end 40 defines a hole 44, dimensioned and configured to be aligned with the holes 34 when the sleeve end 40 is within the sleeve 18, and to receive the pin 36 therethrough. The levering in adaptor 14 is thereby secured within the sleeve 18 by the pin 36, and is permitted to pivot around the pin 36 by the cutout section 38. The drive shaft engaging end 42 is dimensioned and configured to engage the tip 46 of the drive shaft of a levering in assembly (not shown, and well known). In a preferred embodiment, the drive shaft engaging end 42 is dimensioned and configured to fit within a square hole at the tip 46 of the drive shaft. To lever the circuit breaker 64 forward or rearward within the cabinet 66, the levering in adaptor 14 is positioned to engage the drive shaft, and then the crank handle 12 is rotated in the appropriate direction.

Figure 4:
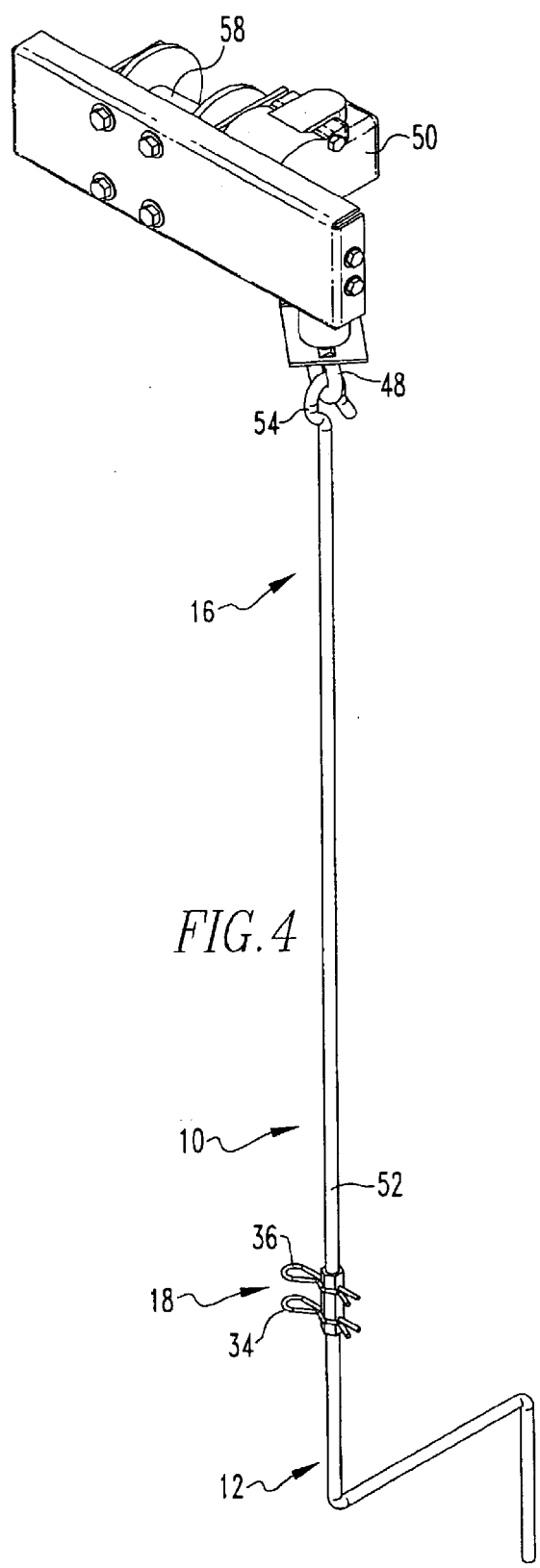
FIG. 4 is an isometric view of an integrated circuit breaker levering in and hoist crank tool of the present invention, illustrating the tool with the hoist crank operating pole installed, and engaging the crank of a winch.
Figure 5:
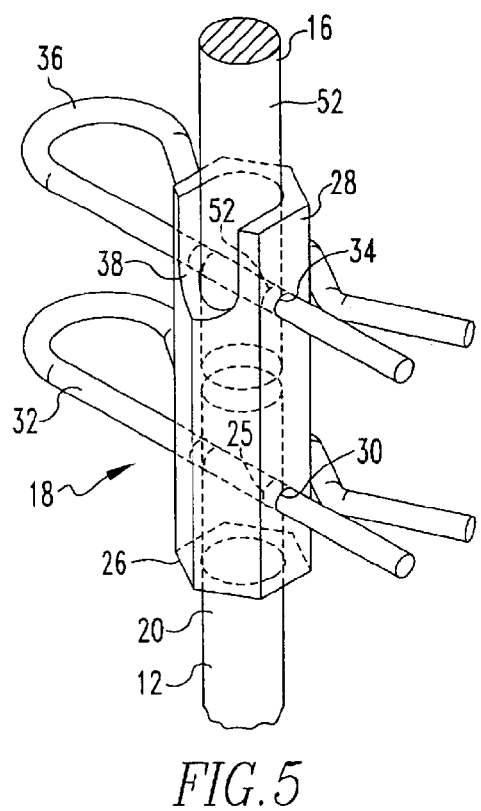
FIG. 5 is an isometric view of the sleeve of an integrated circuit breaker levering in and hoist crank tool according to the present invention, having both a crank and a hoist crank operating pole installed therein.

Referring to FIGS. 4–5, the tool 10 is illustrated in a configuration enabling it to be used to operate the hoist crank 48 of the winch 50. For this task, the hoist crank operating pole 16 will be used. The hoist crank operating pole 16 includes a sleeve end 52 and a hoist crank engaging end 54. The sleeve end 52 defines a hole 56, dimensioned and configured to align with the holes 34 within the sleeve 18 when the operating pole 16 is inserted into the sleeve 18, and to receive the pin 36 along with the holes 34. Referring specifically to FIG. 5, the operating pole 16 extends sufficiently far into the sleeve 18 so that it will not pivot about the pin 36, despite the cutout 38 within the sleeve 18. Referring back to FIG. 4, the hoist crank engaging end 54 may have the configuration of a hook for engaging a ring shaped hoist crank 48. By rotating the crank handle 12, the hoist crank 48 is turned, thereby turning the spool 58 of the winch 50, extending or retracting the winch's cable (not shown, and well known).

Figure 6:
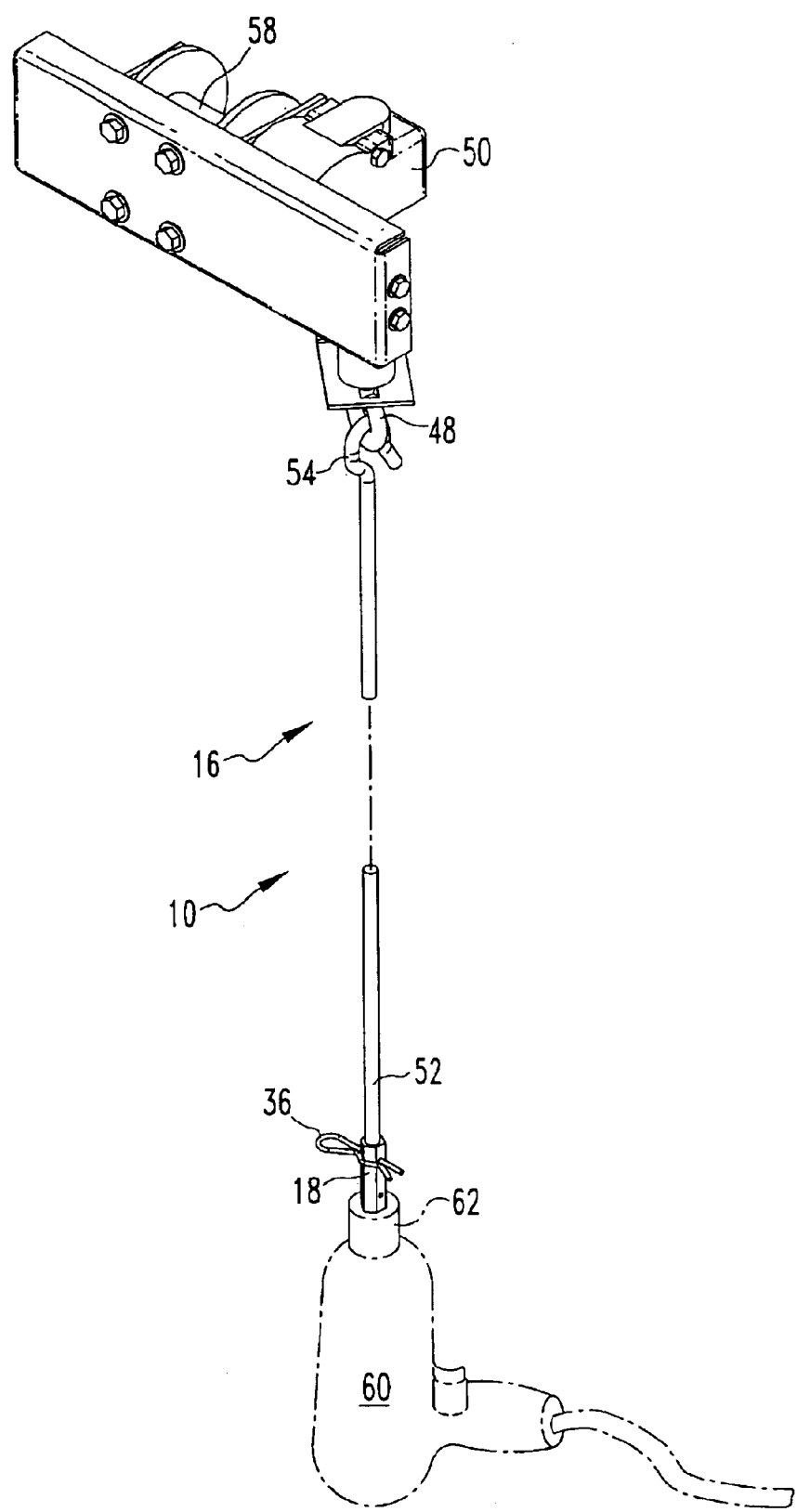
FIG. 6 is an isometric view of an integrated circuit breaker levering in and hoist crank tool according to the present invention, illustrating the tool having the hoist crank operating pole installed and engaging the crank of a winch, and the hand crank removed, with an air socket wrench engaging the hexagonal sleeve.

Referring to FIGS. 5 and 6, the pin 32 has been removed from the sleeve 18, permitting removal of the crank handle 12 from the sleeve 18. An air socket wrench 60 is being used to operate the tool 10. The hexagonal shape of the sleeve 18 permits the sleeve 18 to engage the socket 62 of the air socket wrench 60, permitting the air socket wrench 60 to turn the tool 10, thereby rotating the hoist crank 48, and spool 58 of the winch 50.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof

What is claimed is:

1. An integrated circuit breaker levering and hoist crank tool, comprising:

a drive member structured to facilitate rotation of the tool by a human operator;

an adaptor dimensioned and configured to mate with either tip of a drive shaft of a levering in assembly or a crank of a winch;

a coupler having a pair of ends, structured to attach to the drive member at one end, and to the adaptor at the other end;

wherein the coupler is in the form of a sleeve;

wherein the coupler includes a locking device that locks the adaptor to the coupler;

wherein the locking device includes a removable pin passing through both the adaptor and the coupler;

wherein the removable pin forms a pivot point between the adaptor the coupler; and wherein the sleeve defines a cutout dimensioned and configured to permit pivoting of the adaptor between a first position wherein the coupler and adaptor are substantially parallel, and a second position wherein the coupler and adaptor are substantially perpendicular.

2. The tool according to claim 1 wherein the adaptor for the crank of the winch is dimensioned and configured to be secured within the coupler at a depth sufficient so that the sleeve resists pivoting of the adaptor for the crank of the winch.

* * * * *